United States Patent Office 3,452,450
Patented July 1, 1969

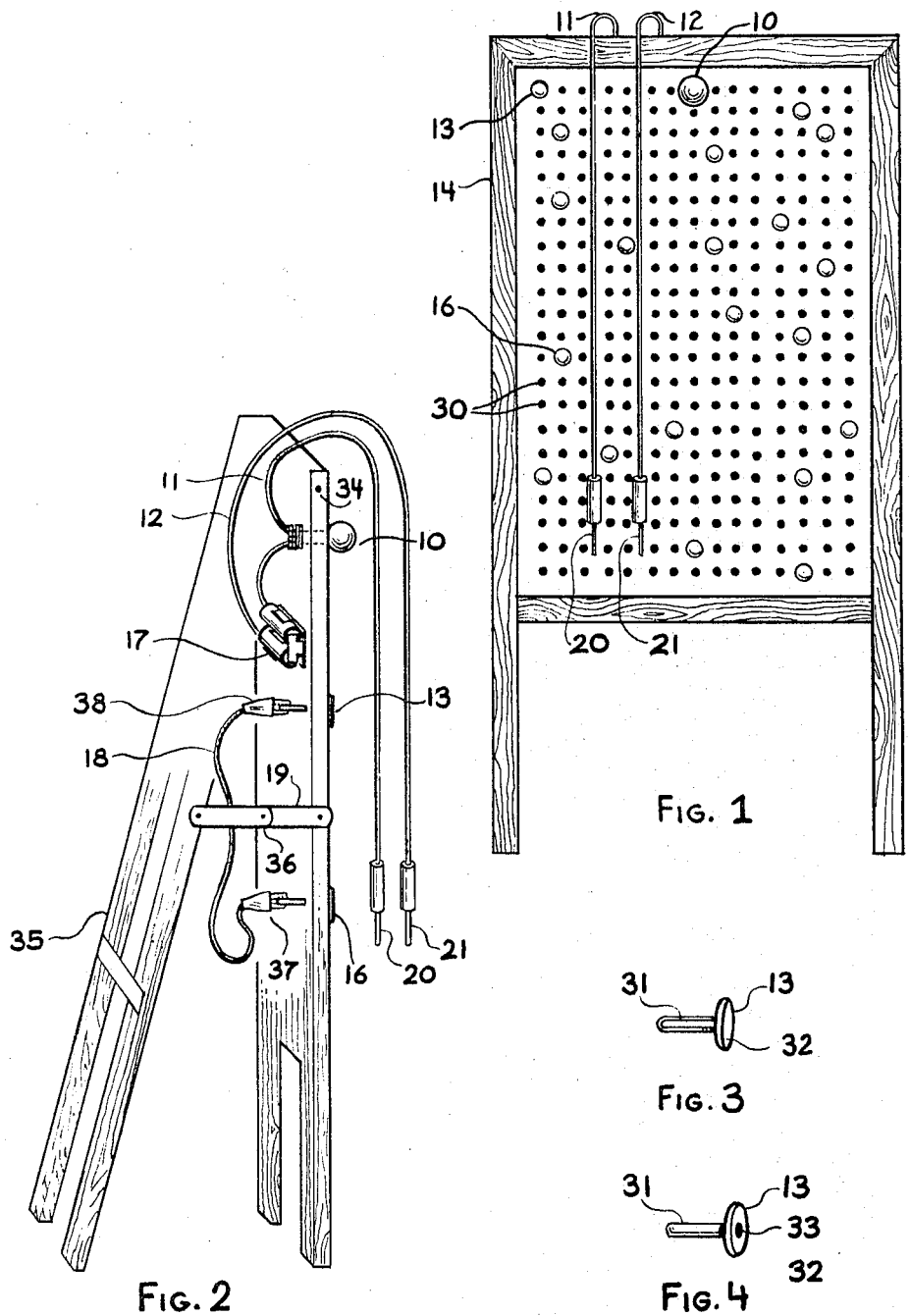

3,452,450
EDUCATIONAL APPARATUS
Howard J. Haarmann, 83—12 258th St.,
Floral Park, N.Y. 11004
Filed May 16, 1966, Ser. No. 550,463
Int. Cl. C09b 7/06
U.S. Cl. 35—9                                                 9 Claims

ABSTRACT OF THE DISCLOSURE

An improved educational gaming-apparatus which has a panel containing a plurality of holes in which contactors are selectively inserted in the holes for connection to an electrical circuit. The apparatus is also provided with a pair of test probes which will close the electrical circuit to a bell or light when the probes are connected to two or more contactors which are wired together on the back of the panel as part of a programming scheme.

This invention relates to an educational apparatus, and more particularly to a device for teaching all subjects to persons by way of graphic illustrations.

While apparatus of the general character is well known in the art, most of those readily available have the disadvantage that the student memorizes the pairing of particular questions and their placements after repeated usage of the apparatus so that the skills required to produce correct answers disappear in favor of a memorized plot of answers. The present apparatus permits the instructor or operator to disconnect the program of the apparatus after each test and rearrange a new program by selectively interconnecting any one of a plurality of pairs of contacts on the front face of the apparatus before giving another test. The multiplicity of combinations of circuits to which the apparatus may be wired is only dependent on the size and number of contacts to which the apparatus may be suited and not upon its functtional use.

Therefore, an object of the present invention is to provide an apparatus so constructed that a particular set of questions may be differently orientated with their respective answers simply by selectively interchanging the interconnections of selected terminals for each program.

Still another object of the present invention is to provide an educational device that is highly attractive, neat in appearance, simple in construction and manufacture, strong, durable, highly efficient in operation, and which may be used by students of all ages.

Another object is to provide an apparatus which is inexpensive having low voltage circuitry so as to be made commercially available at popular prices, to avoid excessive current drain, and to be absolutely safe in the hands of all students.

Other objects and advantages will become apparent from the ensuing description which, taken with the accompanying drawings, discloses by way of example the apparatus according to the invention.

In the drawings, wherein corresponding numbers are used to describe similar elements throughout the several views:

FIG. 1 is a front view of the circuit arrangement of the apparatus according to the invention.

FIG. 2 is a side view of the apparatus of FIG. 1,

FIG. 3 is an isometric view of one of the plurality of contactor buttons inserted into the apparatus of FIGS. 1 and 2, and FIG. 4 is a view of another embodiment of a contactor button for use with the apparatus according to the invention.

Referring now to FIGS. 1 and 2, there is shown an educational apparatus having rectangular supporting frame 14 having a rectangular panel 15 mounted and enclosed therein. Panel 15 contains a plurality of holes 30 distributed in a symmetric or attractive configuration throughout its surface. Holes 30 are adapted to receive contactor buttons 13 to be inserted therethrough. Contactor buttons 13 include a long shank portion 31 having a diameter approximately equal to the diameter of hole 30 so that its shank 31 may be pressed-fitted into each of holes 30. Shank portion 31 may either be solid or be comprised of spring wire for gripping the button into the holes of panel 15. Contactor button 13 also contains a flange 32 mounted at the end of shank 31 having a diameter larger than the diameter of holes 30 but smaller than spacing of the holes in panel board 15. As shown in FIG. 4, contactor button 13 may also include a hole 33 disposed concentrically in the face of flange 32, having a depth and diameter sufficient to receive plugs 20 or 21 of probes 11 and 12.

Mounted at a conspicuous location on the front of panel 15 is an indicating device 10 which may consist of a light bulb or buzzer or both for indicating the completion of an electrical circuit by probes 11 and 12. Probe 11 is connected to one terminal of indicating device 10. A pair of batteries or electrical supply means 17 is mounted conveniently on the back side of panel 15 and include probe 12 coupled to one of its output terminals. The second terminal of voltage supply 17 is coupled to the second terminal of indicating device 10 so that a complete circuit is formed when plug 20 makes electrical contact with plug 21 and fires indicating device 10.

Frame 14 of the educational device is hinged at its top by hinge 34 to backrest 35 extending at a declining angle from the top of frame 14 so as to form an upstanding support easel for the educational device. In addition, one or more lateral brackets 19 may connect frame 14 to backrest 35 to maintain the spacing and the angular relationship of the backrest to the frame during its use. Bracket 19, which is pinned to both backrest 35 and frame 14 may include a hinged center portion 36 for collapsing the easel for storage when not in use. The educational device is also provided with a number of interconnecting conductors 18 having at each of its ends coupling means, such as sockets 37 and 38 adapted to make electrical contact to shank 31 of contactor button 13 at the back panel 15. Conductors 18 may also employ alligator clips at its ends to make connection with buttons 13. It is obvious that conductor 18 may contain more than two socket ends in order to connect a plurality of contactor buttons electrically together on the back of panel 15. The educational device may also be provided with a terminal strip (not shown) containing a plurality of contactor buttons all electrically interconnected to serve as a common potential source anywhere throughout the location of holes 30. The terminal strip may be constructed by either placing a metal band to join each of the contactor buttons along the horizontal, vertical or diagonal direction, or by providing a series of jumper probes to connect selected ones of contactor buttons 13, both on the front and rear faces of panel 15. If conductors 18 employ alligator clips, a plurality of clips may be connected to the same button so that terminal strips will not be necessary.

The operation of the educational device proceeds as follows:

The instructor places within the holes 30 of panel 15 a plurality of contactor buttons 13 arranged in any preselected or desired configuration. Generally, one group of contactor buttons arranged along one side of panel 15 will represent a plurality of multiple choice questions, and the answers will be represented by a second plurality of contactor buttons located along an opposite side from the first question buttons on panel 15. The instructor will then employ a plurality of conductors 18 to interconnect selected question buttons to their respective and proper answer buttons. In some cases it is possible that one question may have two answers so that conductor 18 connected to a specific question button will have to make contact with two or more answer buttons. In a similar manner it is possible that the two questions may have the same answer so that a single answer button will be electrically connected to two question buttons. The question and answer buttons may be identified by any number of well-known means such as color coating each button thus employing one color for question buttons and a second color for the answer buttons, by numbering the contactor buttons, or by numbering and lettering holes 30 to form a grid location system. Thus, for example, all of the columns may be lettered starting with "A" through the highest alphabetical letter, and all of the rows may be correspondingly numbered so that each contactor button may be identified by a letter and a number. It is also obvious that a program printed on large cards or sheets of paper may be placed over contactor buttons 13 on panel 15 to provide a graphically illustrated set of questions and answers. For example, a card may contain a map of a country with the names of the states listed along one column and having an exposed contactor button located in the position of each of the countries drawn in blank on the map.

It becomes apparent after repeated use of the educational device, that the students will memorize the physical location of the question and corresponding answer buttons. When the instructor senses that the students are obtaining the answers to the questions by merely memorizing the location of the answer buttons with respect to the question buttons rather than learning the program, he may rearrange the placement of conductors 18 by interconnecting the question and answer buttons so that the location of the question or answer buttons or both may be reorientated. It can thus be seen that the number of combinations possible with this type of educational device are almost unlimited for a panel containing a multiplicity of holes 30.

Thus it can be seen that the educational device, according to this invention, may be reprogrammed after each consecutive use by rearranging interconnecting conductors 18 to each of the question and answer contactor buttons or by relocating each of the contactor buttons to new hole positions on panel 15. In addition, a series of dummy contactor buttons may also be employed having no interconnecting circuitry, but merely placed on the board to confuse the student during his selection of answers for the questions presented.

The apparatus, according to the invention, may also be employed as an amusement device rather than an educational device by two or more persons, whereby one person will program a plurality of contactor buttons, each connected to either a common terminal-strip or one or more other buttons, and then ask his partner to guess the location of certain buttons on the panel. The apparatus may also be employed as a gaming device for a form of Bingo, whereby the game-card is permitted to be preprogrammed by the Bingo patron to contain a selected number-arrangement under each of the Bingo letters. After each game, the patron can rearrange his board to contain a new column of numbers for each of the Bingo letters, in preparation for the next game.

While only a single embodiment of the present invention is disclosed and illustrated, it is obvious that other variations of the present invention may be possible so that the invention is not to be limited by the disclosure and the illustrations, but as defined in the appended claims.

What I claim is:

1. An improved educational gaming-apparatus comprising a panel having a plurality of holes therethrough, contactor means removably slideably inserted in at least two of said holes, the number of said inserted contactor means being substantially less than said plurality of holes, an electrical power source for producing an output-voltage, indicating means having one lead coupled to said electrical power source, a first test probe having one end coupled to said indicating device, a second test probe having one end coupled to said voltage output, at least one detachable conductor for electrically connecting at least two of said contactor means on said panel so that the opposite ends of said test probes in contact with said contactor means having a common interconnection closes an electrical circuit to said indicating means to produce an indication, the interconnection of said conductors and said contactor means being selectively changeable.

2. The apparatus as recited in claim 1, wherein said indicating device is a bell.

3. The apparatus as recited in claim 1, wherein said indicating device is a light.

4. The apparatus as recited in claim 1, wherein said contactor means comprises a flange having a stem coupled concentrally to one face and having an aperture for receiving said test probe on its opposite face.

5. The apparatus as recited in claim 1, wherein said power source comprises at least one battery secured on the rear face of said panel.

6. The apparatus as recited in claim 4, additionally comprising an easel having a frame for mounting along the circumference of said panel and for providing support thereto, and a backrest hingably coupled to said frame for providing upstanding support thereto.

7. The apparatus as recited in claim 6, wherein said detachable conductors include at least one socket coupled to each of its ends, said socket adapted to make electrical contact with the stem of said contactor means.

8. The apparatus as recited in claim 6, wherein said plurality of holes are equally spaced in horizontal and vertical rows.

9. The apparatus as recited in claim 4, wherein said contactor means has a flange diameter smaller than the spacing of said holes.

References Cited

UNITED STATES PATENTS

| | | | |
|---|---|---|---|
| 309,064 | 12/1884 | Kinch | 35—9 |
| 319,224 | 6/1885 | Gates | 35—9 |
| 1,100,362 | 6/1914 | Evans | 35—60 |
| 1,278,395 | 9/1918 | Singer | 35—9 |
| 2,139,860 | 12/1938 | Schwendeman | 35—9 |
| 2,275,988 | 3/1942 | Parker | 35—9 |
| 2,442,014 | 5/1948 | Myers | 35—9 |
| 2,697,882 | 12/1954 | Gruot | 35—9 |
| 3,070,904 | 1/1963 | Saba | 35—9 |

FOREIGN PATENTS

| | | |
|---|---|---|
| 136,074 | 10/1929 | Switzerland. |
| 257,434 | 10/1948 | Switzerland. |

EUGENE R. CAPOZIO, *Primary Examiner.*

WALTER W. NIELSEN, *Assistant Examiner.*